Oct. 16, 1934.    B. R. BENJAMIN    1,977,422
CULTIVATOR BEAM STRUCTURE
Filed July 5, 1932
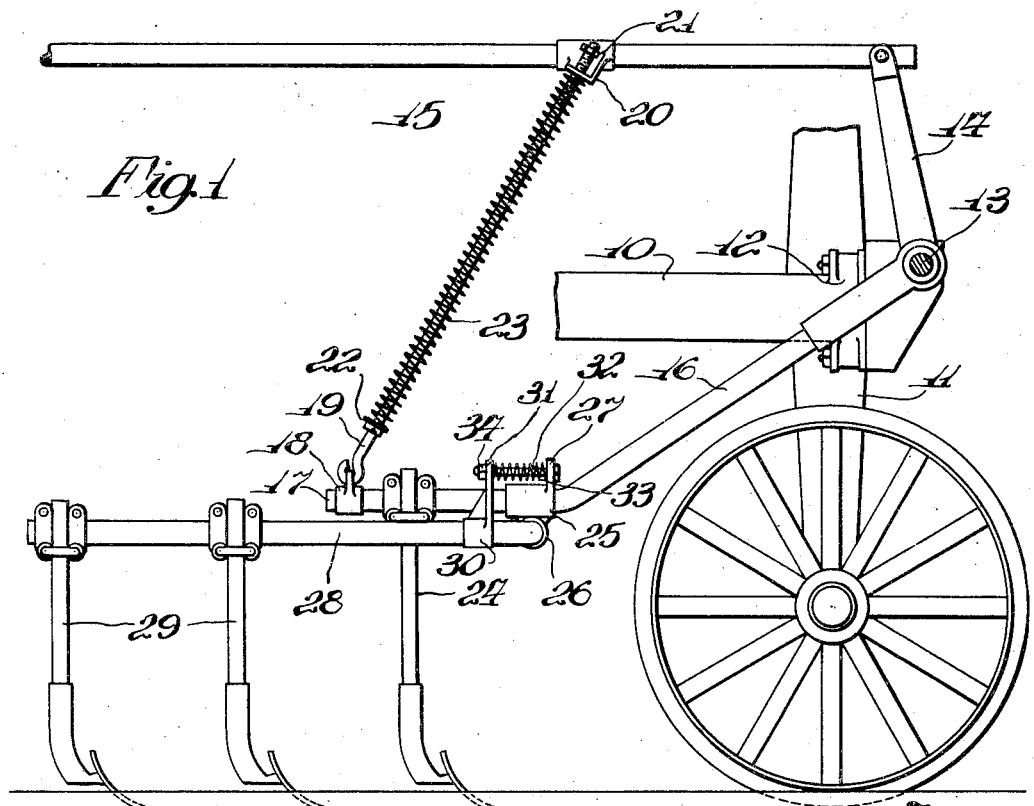
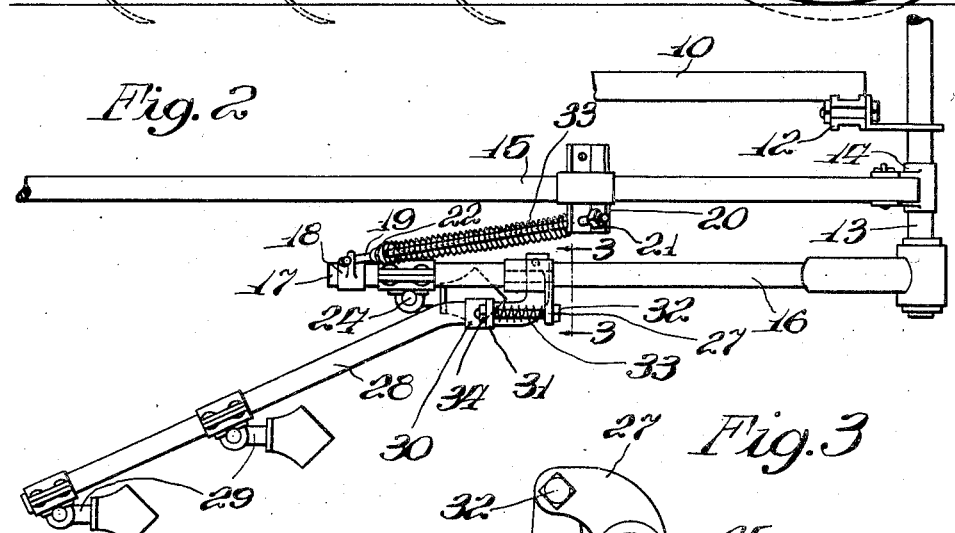
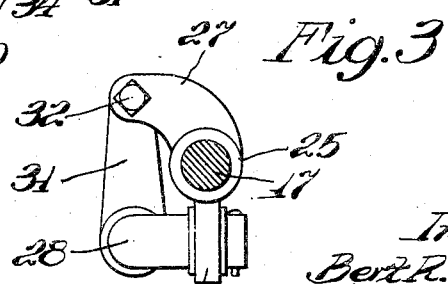

Patented Oct. 16, 1934

1,977,422

UNITED STATES PATENT OFFICE 1,977,422

CULTIVATOR BEAM STRUCTURE

Bert R. Benjamin, Oak Park, Ill., assignor to International Harvester Company, a corporation of New Jersey Application July 5, 1932, Serial No. 620,811

1 Claim. (Cl. 97—179)

The present invention relates to straddle-row cultivators, and particularly to the beam structure thereof.

On cultivator beams heretofore used, the beam and the gang of earth working tools or shovels carried thereby have been formed as one rigid structure on which the shovels are disposed in complemental relation in the same horizontal plane, usually in stepped, offset relation, on an oblique line extending away from the plant row space straddled by each pair of beams. When row crops are being grown on listed or bedded fields where the beds may vary in height and slope, the rigid type of beam does not permit the shovels to conform to the contour of the sides of the bed and, therefore, does not permit efficient cultivation.

The principal object of this invention is to provide a beam structure on which the outer shovels of a conventionally arranged cultivator gang are so mounted as to have vertical swinging movement independently of the inner shovel or shovels of the gang, so that the difference in soil levels next to and away from the plant row may be automatically conformed to and an even depth of cultivation effected.

Other objects of the invention are to provide for distributing spring pressure on the members of a flexible beam structure, such as above referred to, and for lifting and lowering such a structure as a unit.

The foregoing, as well as other objects and advantages residing in the invention will become obvious from the detailed description of structure hereinafter given and illustrated in the accompanying drawing, where:

Figure 1 is a side elevation of a cultivator beam embodying the invention shown in position on a portion of its support;

Figure 2 is a plan view of the beam and related parts shown in Figure 1; and,

Figure 3 is a detail sectional view on the line 3—3 of Figure 2.

In the present instance the invention has been illustrated as embodied in a cultivator beam forming part of a straddle-row cultivator attachment for a row crop tractor of the kind shown, for instance, in the patent to Benjamin, No. 1,854,879 of April 19, 1932. This type of tractor comprises a frame, a part of which is shown at 10, and a front support and steering truck 11. The front support of the tractor is provided with corner brackets 12 which carry a transversely extended draft bar or shaft 13 extending beyond each side of the tractor. In the present instance the bar 13 is shown as a shaft having secured thereto an upstanding arm 14, the upper end of which is pivoted to a rearwardly extending lift rod 15 which is connected to suitable means (not shown) located on the rear of the tractor for reciprocating the rod 15 to thereby oscillate the shaft 13. As each beam of the usual pair for each row is identical in structure, only one beam is shown on the drawing and will be described. The end of shaft 13 has pivotally mounted thereon the forward end of a main dragbar 16 forming part of the cultivator beam structure to be described. The bar 16 inclines downwardly and rearwardly and terminates in a substantially horizontal rear portion 17. The rear end of the horizontal portion 17 is provided with an eye member 18 connected to a lifting link 19, the upper end of which moves freely through an aperture in a lateral wing on a bracket 20 carried by the rod 15. A stop 21 is provided on the upper end of the lifting link 19, which is engaged by the bracket 20 upon forward reciprocation of the rod 15 to lift the cultivator beams. At its lower end the lifting link 19 carries an adjustable collar 22 forming a lower abutment for a coiled spring 23, the upper end of which bears against the bracket 20, thus providing for spring pressure on the rear end of the main dragbar 16. The rear portion 17 of the main dragbar has mounted thereon an earth working element, such as a cultivator shovel 24, and, forwardly of this shovel, the portion 17 of the dragbar has secured thereto a sleeve 25 provided with a transverse horizontal bearing 26 on its lower side and with a laterally extending abutment arm 27 on its upper side. The bearing 26 serves to receive the front end, or pivot, for an auxiliary dragbar 28, which extends obliquely rearwardly and away from the main bar 16, as shown in Figure 2. This bar is preferably formed with an integral, angular extension at its front end to constitute the pivot received in bearing 26 and with a short portion extending parallel to the main bar adjacent said pivot portion. The bar 28 carries a series of shovels 29 spaced along its length, so as to be in substantially complemental, stepped, offset relation to the shovel 24 on the main dragbar. In order to provide for spring pressure on the auxiliary dragbar 28 its forward end has secured to it a collar 30 formed with an upstanding arm 31 facing the arm 27. The arms 27 and 31 are on opposite sides of the pivot of the auxiliary dragbar 28 and are provided with openings to receive a bolt or link 32 which supports a coil spring 33 abutting each of the arms. An adjustable nut 34 on the rear end of the bolt 32 enables the auxiliary dragbar 28 to be independently adjusted for depth, and the spring 33 yieldably holds the bar at adjustment.

With the construction illustrated, it will be obvious that by reason of the floating or pivoted construction of the auxiliary dragbar 28, the outer shovels of the gang can either rise or fall to accommodate variations in the soil surface independently of the depth of cultivation which may be set for the shovel immediately adjacent the plant row, which shovel is mounted on the main dragbar. The construction also affords a yielding pressure on all of the shovels of the gang and permits the entire beam to be lifted as a unit, by reason of the fact that the adjusting nut 34 on the bolt 33 will pick up the auxiliary dragbar when the main dragbar 16 is swung upwardly.

The preferred embodiment of the invention disclosed is, of course, subject to variations without departure from the scope of the invention as defined in the following claim:

What is claimed is:

In a straddle-row cultivator, a support, a cultivator beam having a main dragbar pivoted at its forward end on the support, means on the support for raising and lowering said dragbar including a spring pressed link connected to the rear end of said dragbar, an auxiliary dragbar extending obliquely away from one side of the main dragbar and pivoted thereto on a horizontal axis, earth working tools on said dragbars, a link and spring connected to the respective dragbars across said pivotal connection and acting to resist upward movement of the auxiliary dragbar, and a stop on the link to limit its downward movement.

BERT R. BENJAMIN.